United States Patent Office 3,325,135
Patented June 13, 1967

3,325,135
HOLD-DOWN DEVICE
Thomas R. Clarke, Baton Rouge, La., assignor to Ethyl Corporation, New York, N.Y., a corporation of Virginia
Filed Feb. 26, 1965, Ser. No. 435,487
1 Claim. (Cl. 248—361)

This invention relates to a hold-down device for attaching netting to ground surfaces.

Newly graded earth surfaces, such as those found on road bed shoulders or the banks of drainage ditches, often are covered with a layer of straw mulch. The mulch is necessary to prevent erosion prior to the time that grass is grown on the slope. Winds often dislodge a considerable amount of the mulch before the grass seeds sprout. In an effort to hold the mulch in place an expendable netting of twisted paper tapes has been used. This type netting is held to the earth surfaces by large U shaped metal staples. More recently, woven netting made of a thermoplastic material, particularly monofilament polypropylene, has been developed. This netting has found a wide variety of uses, one of which is holding mulch straw on earth surface. The plastic netting has the advantage of being reusable. Additionally, the plastic netting finds use in covering canal banks and bottoms to prevent erosion and washing. The netting is further used in other installations where permanence is desired. Metal staples are not very satisfactory for use with the plastic netting due to their limited life. They corrode and allow the netting to break free after a relatively short period of time. Thus, there is a need for a hold-down device for plastic netting that will be permanent and which can be reused.

An object of this invention is to provide a reusable hold-down device for holding plastic netting to the ground.

Another object of this invention is to provide a hold-down device that engages the plastic netting securely.

An additional object of this invention is to provide a hold-down device for plastic netting that is economical to manufacture.

The foregoing, and other aims, objects, and advantages of the invention as may appear hereinafter are realized in an anchor for holding netting in a fixed position, which anchor includes a generally T shaped member having an elongated shank portion adapted to be inserted in the material covered by the netting. The T shaped member has an elongated head portion attached to the upper end of the shank portion and extending outwardly therefrom. The head portion is adapted to engage the netting and to retain it in a fixed position.

Figure 1:
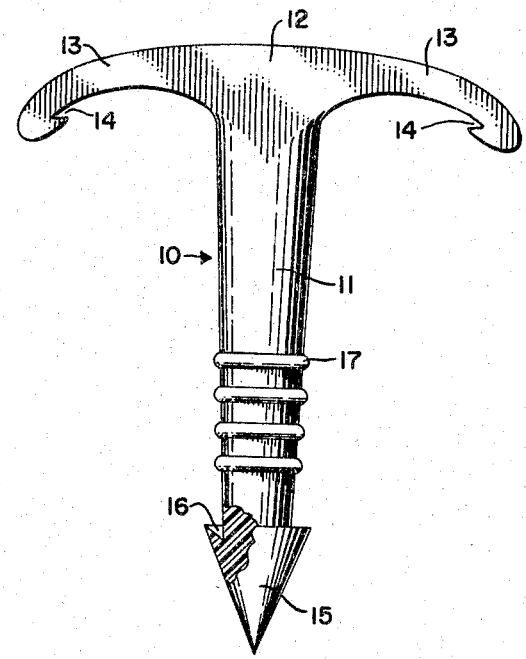
FIGURE 1 is an elevational view of an exemplary form of the hold-down device of the present invention.

Referring now to FIGURE 1 the hold-down device, referred to generally by the numeral 10, has the form of a T shaped member having an elongated shank portion 11. The shank portion has an elongated head portion 12 attached to its upper end. The head portion is integrally formed or it may be attached to the shank portion by any suitable means. The head portion includes laterally extending arms 13 which curve downwardly and terminate at their ends in a hook. The hook is formed by a notch 14 cut in the underside of each of the arms.

Figure 2:
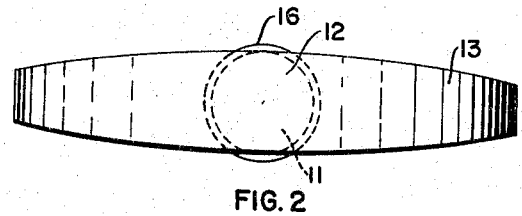
FIGURE 2 is a plan view of the hold-down device of FIGURE 1.
Figure 8:
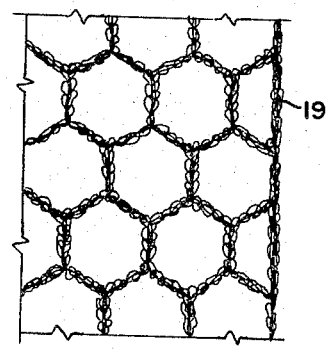
FIGURE 8 is a plan view of a piece of woven plastic netting with which the present invention may be used.

As seen in FIGURE 2 the head portion 12 tapers gradually from the thickest portion adjacent the shank 11 to the thinnest portion at the ends of arms 13. However, if desired the head portion may be of any shape, i.e., cylindrical, rectangular or otherwise so long as it extends transversely from the shank portion and provides means on its ends to engage the netting.

As seen in FIGURE 1 the lower end of the shank 11 terminates in a cone-shaped barbed point 15. The cone-shaped point 15 has a transversely extending circumferential barb formed by a lip 16 which provides means for securely anchoring the hold-down device in the earth. Additionally, the shank 11 may be provided with a plurality of spaced-apart, circumferential, annular projections 17 integrally formed on the lower portion of the shank. The annular projections 17 are optional and may be provided if it is desired to increase the anchoring qualities of the hold-down device.

Figure 3:
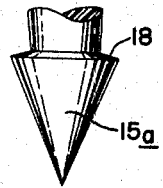
FIGURE 3 is an elevational view of the lower end of an alternative form of a hold-down device.

As seen in FIGURE 3 the lower end of the hold-down device may be equipped with a different type of barbed point 15a. This type of point has a downwardly sloping shoulder 18 engaging the lower end of the shank 11. This type of barbed point permits the hold-down device to be more readily removed from hard earth formations.

The device may also be made without the circumferential barb, by providing a cone-shaped point at the lower end of shank 11.

The hold-down device is preferably formed by injection-molding a plastic material. Suitable plastics for fabricating the hold-down device are polyvinyl chloride, polyethylene, polypropylene, ABS (acrylonitrile-butadiene-styrene), acrylonitrile homopolymers, phenolic-type thermosetting polymers and others. It is preferred to use a semi-rigid thermoplastic for forming the hold-down device such as polyethylene, polyvinyl chloride, or polypropylene. A particularly preferred material is polyethylene. It has the advantage of low cost, long life and good flexibility.

The invention is not limited to hold-down devices formed of plastic material. If desired, metal or a suitable material may be used to fabricate the device. However, when metal is used it may not provide the long life and low cost that are obtained when a plastic material is used.

The dimensions for the hold-down device of the present invention will be dictated primarily by the type of soil in which the device is to be used. In hard soils the dimension of the shank 11 will be shorter than when the device is used in loose or sandy soil. In general, the T shaped hold-down device will have a head dimension of about 3½ to 5 inches in length and a shank dimension of about 5 to 8 inches in length.

Figure 4:
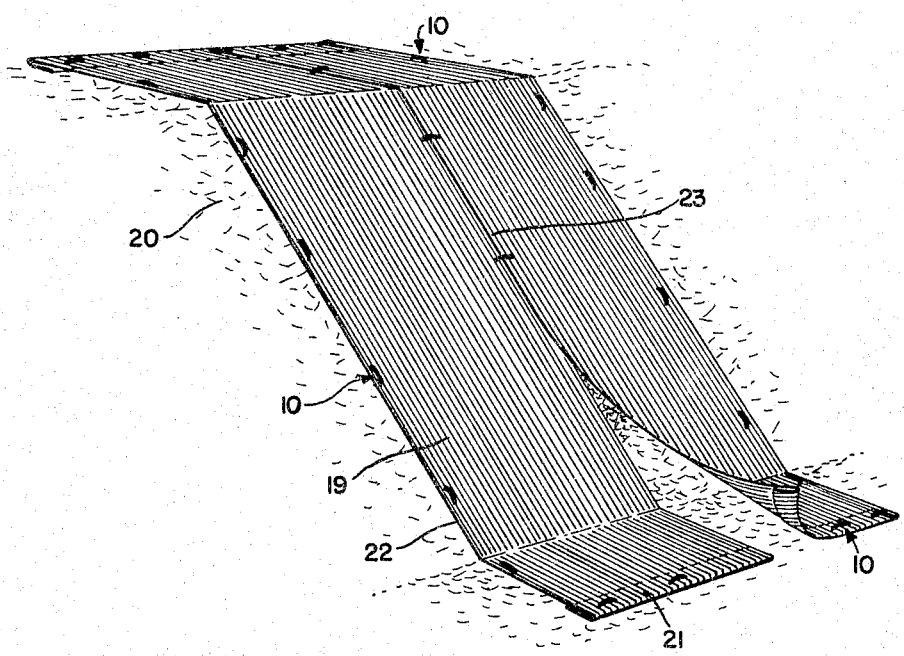
FIGURE 4 is a perspective view of a mulched sloping earth surface covered by plastic netting which is held down by the device of the present invention.
Figure 5:
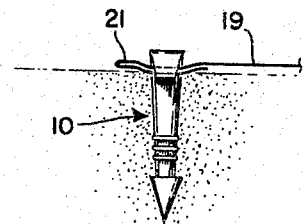
FIGURE 5 is an enlarged elevational sectional view of the earth along the end of the netting of FIGURE 4.
Figure 6:
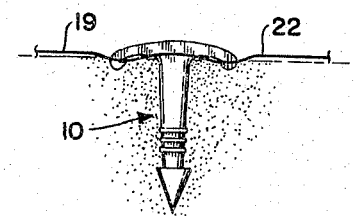
FIGURE 6 is an enlarged elevational sectional view of the earth along the edge of the netting of FIGURE 4.
Figure 7:
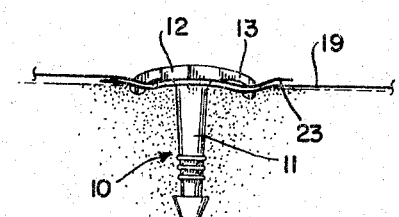
FIGURE 7 is an enlarged elevational sectional view of the earth along the lapped seam of the strips of netting of FIGURE 4.

Referring now to FIGURE 4, the hold-down device 10 is shown attached to netting 19 on a ground slope that is covered with mulch 20. As shown more clearly in FIGURE 5, the hold-down device 10 is inserted through a mesh opening in the netting and pushed firmly into the ground to hold the folded end 21 of the netting firmly to the ground. FIGURE 6 shows the hold-down device 10 attached to the netting along the edge portion 22 of the netting. In FIGURE 7 the hold-down device engages the lapped edge portions 23 of the netting 19. As can be seen, the shank portion 11 of the hold-down device is inserted through the openings provided in the lapped edge portions 23 of the netting and the hooked ends of the arms 13 also engage the netting to provide additional hold-down means.

From the foregoing description of an exemplary installation of netting, it can be seen that the device of the present invention provides a means of securely anchoring netting to a ground surface. In addition to being firmly secured by the shank portion of the hold-down device, the netting is also engaged at two additional points by means of the hooks provided on the ends of the arms 13 of the head portion 12.

The present device can be readily removed from a ground surface at the time the plastic netting is removed and can be reused any number of times for temporary installation of plastic netting. However, the device may also be used for permanent installation of plastic netting such as on the banks and in the channel of irrigation ditches. The hold-down device also finds an advantage in that it may be used in contact with corrosive fluids such as salt water when it is made of plastic.

The foregoing disclosure and description of the invention is illustrative and explanatory thereof and, in light thereof, other modifications will be apparent to those skilled in the art. Therefore, the present invention is to be limited only by the scope of the appended claim.

What is claimed is:

An anchor for holding netting in a fixed position in contact with an earthen surface comprising:
 (a) a generally T shaped member having an elongated shank portion for insertion into said earthen surface;
  (i) said shank portion being provided with a transversely extending circumferential projection adjacent the end thereof to retain said anchor in said earthen surface; and
 (b) an elongated head portion attached to the upper end of said shank portion;
  (i) said head portion including two transversely extending arms having a generally concave shape on their undersides;
  (ii) each of said arms having at the outward end thereof a hook formed by an inwardly facing notch cut in the underside of each of said arms to engage said netting when said anchor is pushed into said earthen surface.

References Cited

UNITED STATES PATENTS

| | | | |
|---|---|---|---|
| 2,560,961 | 7/1951 | Knohl | 151—41.75 |
| 2,939,468 | 6/1960 | Boyce | 248—361 |
| 3,199,187 | 8/1965 | Lyday et al. | 85—5 |

FOREIGN PATENTS 1,317,354   1/1963   France.

CHANCELLOR E. HARRIS, *Primary Examiner.*

JOHN PETO, *Examiner.*